US006123223A

United States Patent [19]

Watkins

[11] Patent Number: 6,123,223

[45] Date of Patent: Sep. 26, 2000

[54] AUTOMATED VENDING SYSTEM FOR FLORAL ARRANGEMENTS

[76] Inventor: Kenneth M. Watkins, P.O. Box 40997, Raleigh, N.C. 27629-0997

[21] Appl. No.: 09/216,760

[22] Filed: Dec. 21, 1998

[51] Int. Cl.[7] .......................... B65G 59/00; A24F 27/14; A47F 1/04; A47F 3/10; A47B 85/00

[52] U.S. Cl. .................... 221/121; 221/150 R; 221/155; 312/125; 108/21; 108/22

[58] Field of Search ................................ 221/76, 150 R, 221/155, 121, 122; 312/125, 135, 305, 267; 108/20, 21, 22

[56] References Cited

U.S. PATENT DOCUMENTS

| | | | |
|---|---|---|---|
| 1,435,441 | 11/1922 | Zsoldos . | |
| 2,617,267 | 11/1952 | Long et al. | 62/102 |
| 2,701,746 | 2/1955 | Piggott | 312/215 |
| 2,800,988 | 7/1957 | Timms | 194/9 |
| 2,808,918 | 10/1957 | Shepard, Jr. et al. | 194/1 |
| 2,811,403 | 10/1957 | Barker et al. | 312/97.1 |
| 2,865,698 | 12/1958 | Smith | 312/35 |
| 2,875,878 | 3/1959 | Hoban | 194/10 |
| 3,170,554 | 2/1965 | Davis | 194/2 |
| 3,443,675 | 5/1969 | Yamamoto et al. | 194/4 |
| 3,791,505 | 2/1974 | Mandell | 194/10 |
| 3,796,294 | 3/1974 | Hoffer et al. | 194/10 |
| 3,866,795 | 2/1975 | Urano | 221/150 |
| 4,311,227 | 1/1982 | Watkins | 194/4 |
| 4,498,603 | 2/1985 | Wittenborg | 221/76 |
| 4,915,205 | 4/1990 | Reid et al. | 221/76 |
| 4,927,051 | 5/1990 | Falk et al. | 221/76 |
| 5,273,183 | 12/1993 | Tuttobene | 221/76 |

*Primary Examiner*—Robert P. Olszewski
*Assistant Examiner*—Bryan Jaketic
*Attorney, Agent, or Firm*—Mills Law Firm PLLC

[57] ABSTRACT

A vending machine featuring rotating stacked carousels for the display and sale of floral and plant arrangements is disclosed. The vending machine is capable of carrying out both cash and credit card transactions and includes a certified credit card terminal for connecting to the credit card processing network. The present vending machine includes an integrated microprocessor to control the mechanical motion and position of the stacked carousels, accept payment from either cash or credit cards, maintain accounting records, provide printed receipts, and to control on-line modem communications with credit approval sources as well as dial-up auditing of machine's inventory. A significant feature of the certified credit card terminal is the ability to transact purchases in both an off-line and on-line mode and the ability to enter bad credit card numbers into a credit card file when purchase is attempted with an invalid card number. The stacked carousel displays can be divided into a plurality of compartments which differ in size to display a varied inventory of floral arrangements. The position of the carousel compartments are controlled by the use of an encoder device which enables carousel rotation to be stopped at a plurality of discrete points on the circumference of each carousel to present the flowers in alignment with a vending door selected by user input on an alphanumeric keypad. The present machine provides a thermostatically controlled, refrigerated environment to maintain the flowers in optimal condition.

15 Claims, 11 Drawing Sheets

CONTROL PANEL FRONT VIEW

CONTROL PANEL BACK VIEW

AUTOMATED VENDING SYSTEM FOR FLORAL ARRANGEMENTS

BACKGROUND OF INVENTION

1. Field of Invention

This invention relates generally to automatic vending systems and, more particularly, to a refrigerated vending system for flower and plant arrangements.

Automated vending systems for floral arrangements are well known to those skilled in the art. Such floral vending systems typically include a plurality of floral product containing cubicles including an access door which is operatively associated with each cubicle. An electronically controlled locking apparatus is utilized with each door being connected to a validating device for accepting and counting the money inserted for purchase of a floral item. For example, U.S. Pat. No. 4,311,227 to Watkins discloses such an automated floral vending system.

To the present date such floral vending systems have been limited to the display of a single floral arrangement within each cubicle thereby providing a limited selection to the consumer. Further, the operators of such a floral vending system have incurred substantial maintenance costs in that the vending system must be serviced on at least a daily basis or on a more frequent schedule if the system is operable 24 hours a day.

In addition, prior art systems must be refilled after floral arrangements have been sold on an arbitrary time schedule without knowing how many cubicles need refilling after a sale is made.

Thus, the present invention has been developed to provide an improved floral and plant vending system which is capable of displaying an increased number of floral arrangements for sale within each cubicle and which includes a certified credit card terminal connected to the credit card processing network and an on-line auditing capability that permits monitoring of inventory status from a remote computer.

2. Description of Related Prior Art

U.S. Pat. No. 4,311,227 to Kenneth M. Watkins discloses a vending system for floral arrangements including a plurality of floral product containing cubicles each of which includes an access door operatively associated with each cubicle. An electronically controlled locking system is utilized with each access door being operatively connected to a currency validator accepting and totaling the money inserted to purchase a floral arrangement.

U.S. Pat. No. 2,800,988 to Ross L. Timms discloses a coin and key controlled vending apparatus for dispensing merchandise to the public comprising a plurality of lockers with access doors, a controllable locking means, a validator for accepting and totaling coins inserted into machine, a plurality of selector means, and a plurality of adjustable control means for setting prices for the merchandise which are inaccessible to the customer. However, the Timms patent does not disclose a rotating carousel mechanism for the display of merchandise, a means for the circulation of refrigerated air between compartments, a means in the money validator for receiving and accumulating paper currency, a means for transacting credit card purchases, or means for on-line monitoring of the vending machine to determine when a locker has been emptied due to a customer transaction.

U.S. Pat. No. 1,435,441 to Julius Zsoldos discloses a vending machine for dispensing of food in automatic restaurants including a plurality of compartments provided with both front and rear closures, a locking mechanism associated with a front closure and electromagnetic means controlled by the operation of the rear closure for closing and locking the front closure. However, the Zsoldos patent does not disclose a rotating carousel display mechanism, a means for transacting credit card purchases, or a means for permitting on-line monitoring of the vending machine to determine when a compartment has been emptied.

U.S. Pat. No. 2,617,267 to Virgil P. Long discloses a circular frozen food locker including a rotatably mounted locker assembly adapted to serve a large number of patrons storing frozen foodstuffs. The individual locker storage spaces are wedge-shaped and are stacked on a turntable in a number of horizontal tiers to provide a corresponding group of vertical rows. Thus, access may be had to each individual locker space by rotating the turntable and opening the appropriate door. However, the Long, et al. patent is not adapted for the commercial sale of merchandise and, thus, includes no money validator or means for transacting credit card purchases, nor does it include a system for on-line monitoring of storage lockers which have been emptied.

U.S. Pat. No. 2,701,746 to Morley W. Piggott discloses a self-service cold storage locker including a rotatable shelving unit having a generally upright cylindrical outline with a plurality of storage compartments. The rotatable shelving unit is mounted on rollers which are set on circular tracks to permit the rotation of individual storage compartments into alignment with an access door unlocking only the door corresponding to the selected freezer compartment. However, the Piggott patent does not include a money validator or means for transacting credit card purchases, nor does it include a system for on-line monitoring of individual storage compartments to determine if a compartment has been emptied.

U.S. Pat. No. 2,808,918 to Francis H. Shepard, Jr. et al. discloses a locker battery merchandising machine including an array of lockers controlled and operated by a coin-controlled mechanism for dispensing, merchandising or vending articles to be placed in the lockers. However, this patent does not disclose a refrigerated air circulation system, a means for accumulating paper currency, a means for transacting credit card purchases, or an on-line monitoring system.

U.S. Pat. No. 2,811,403 to Jack H. Barker et al. discloses a vending machine adapted for dispensing bulky articles having fragile containers such as beverages in paper cartons and having a rotatable carriage for supporting such articles in alignment with an access opening whereby the registering article can be readily removed. This machine is coin operated and has no means for validating paper currency or transacting credit card purchases. Further, this machine has no means for on-line monitoring of individual compartments to determine when a sale has been made and such compartment is empty.

U.S. Pat. No. 2,865,698 to John D. Smith discloses a coin controlled vending machine comprising a plurality of compartments with access doors, controllable locking means released by solenoids, a validator means for accepting and totaling coins inserted into the machine, a plurality of selector means, and a plurality of adjustable control means inaccessible to the customer for setting prices. However, the Smith patent does not disclose a means for providing refrigerated air circulation between compartments, a rotating carousel device for the display of articles, a money validator capable of accumulating paper currency, a means for transacting credit card purchases, or an on-line auditing system in the manner of the present invention.

U.S. Pat. No. 3,791,505 to Darla R. Mandell discloses a modular solid state system for operating vending machines. Basically, this apparatus includes a currency deposit, currency evaluator, a solid state accumulator to keep track of the currency deposit, an enable means, a solid state release control means, and a servomotor release means to release a vended item. However, the Mandell patent does not disclose a means for transacting credit card purchases or an on-line auditing system in the manner of the present invention.

U.S. Pat. No. 3,796,294 to Arthur Hoffer et al. discloses a vending machine door lock and vended item carrier motion control having a number of levels of carriers for items to be vended. The carriers on each level are all moved along a predetermined pathway thereby delivering the carriers in sequence to an access door at each level. Each door is blocked closed by a solenoid controlled door blocking abutment in circuit with a proper deposited coinage activated switch associated with each level. However, the Hoffer patent does not disclose a money validator capable of accumulating paper currency, an on-line auditing system for determining when an item has been vended, and other features of the present invention.

U.S. Pat. No. 3,866,795 to Hitomi Urano discloses a vending machine for selling hot foods which includes a cold storage and a heating chamber. The cold storage comprises a number of vertical containers having two or more channels for storing food products of the same or different kinds, a feed arrangement being provided for providing food products from the respective channels to the heating chamber under the control of a coin operated device. However, the Urano patent does not disclose a rotating carousel device for the display of vended items, a money validator capable of accumulating paper currency and transacting credit card purchases, or an on-line auditing system in the manner of the present invention.

U.S. Pat. No. 2,875,878 to Fairfield W. Hoban discloses a coin-controlled vending machine having a plurality vending compartments arranged on article conveyors arranged in superimposed tiers accessible by normally closed sliding doors which facilitate the removal of an article carried by its conveyor. All of the doors are provided with electrically interconnected control means arranged such that when one of the doors opened all of the other doors are prevented from opening and wherein the operation of all of the doors is controlled by a single coin receiver for the entire machine. However, the Hoban patent does not disclose a money validator capable of accumulating paper currency, a means for transacting credit card purchases, an on-line monitoring system, and other features of the present invention.

U.S. Pat. No. 3,170,554 to Lill Davis discloses a coin-operated service buffet counter which includes service sections and delivery sections provided for the handling of hot and refrigerated foods and wherein each article of food as dispensed is recorded in accordance with coins deposited for operation of that section to provide an accurate record of each class of food dispensed. However, the Davis patent does not disclose a money validator capable of accumulating paper currency, a means for transacting credit card purchases, an on-line monitoring system to determine the status of individual sections, and other features of the present invention.

Finally, U.S. Pat. No. 3,443,675 to Mititaka Yamamoto et al. is considered of general interest in that it discloses an automatic credit loan machine operable in response to a credit card introduced therein to dispense a predetermined loan of cash including a means for testing the genuineness of a credit card, means operable in response to the testing means for reading the identification number of the credit card, means for recording the identification number, means for storing genuine cards that have been introduced into the machine, and means for dispensing predetermined loan of cash.

SUMMARY OF THE INVENTION

After much study of the above mentioned problems, the present invention has been developed to provide a vending system for floral and plant arrangements wherein a consumer may purchase fresh flowers suitable for a variety of occasions. The present vending system provides a refrigerated environment for the display of fresh flower arrangements which may be purchased by cash or credit card transaction at any time 24 hours per day.

The present apparatus features continuously rotating carousel type displays which are divided circumferentially into wedge-shaped compartments each containing a floral arrangement.

To purchase a floral arrangement the customer views the flower selections rotating in the carousel display and inputs a selection through a standard numeric key pad. The selection number is then presented on an LCD display which is used for prompting customer input and showing the status of the purchase process.

The present system provides a money validator capable of accumulating paper currency and also a credit card terminal including a self-contained processing unit certified as a terminal for dial up and access to the credit card processor network through a modem to verify and approve the card for the purchase. The modem connection also enables on-line auditing of the vending system for the details of each cash and credit card sale including the time and date of purchase to enable the operator to maintain the vending system at optimum capacity.

In view of the above it is an object of the present invention to provide a refrigerated vending apparatus having continuously rotating carousels to provide the consumer with fresh flowers 24 hours per day.

Another object of the present invention is to provide a floral vending system which features continuously rotating carousel type displays to permit a consumer to fully view a floral arrangement prior to purchase.

Another object of the present invention is to provide a floral vending system capable of carrying out paper money and credit card transactions.

Another object of the present invention is to provide a floral vending system including a self-contained credit card processing unit for connection to the credit card processing network through a modem connection to verify and approve the credit card for purchase.

Another object of the present invention is to provide a floral vending system including a remotely operable audit program which details each cash and credit sale showing the time and date of purchase, transaction number, selling price, amount of cash received, bin number and credit card number. The audit data provides the owner/operator of the vending system with an accurate and up-to-date count of customer sales and information necessary for restocking.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
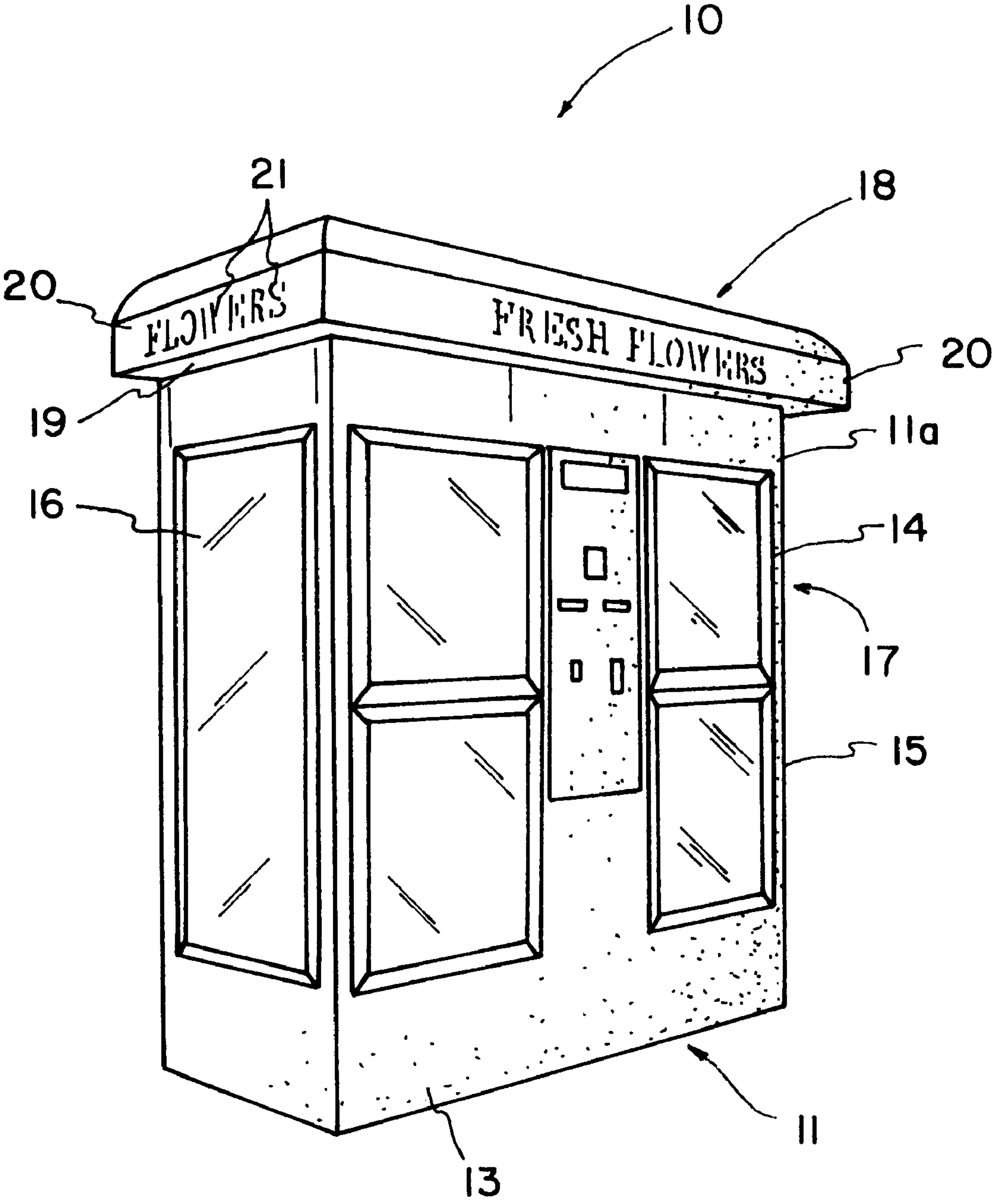
FIG. 1 is a perspective view of one embodiment of the floral vending machine of the present vending system.

With further reference to the drawings, there is shown therein a vending apparatus for floral and plant arrangements illustrated in FIG. 1 and indicated generally at 10. The vending apparatus 10 includes a box-shaped housing 11 wherein a plurality of hinged access doors are provided to allow removal of the flowers after purchase.

In the preferred embodiment the vending apparatus 10 includes four individually operated vending doors 12, 13, 14, and 15, and a pair of opposed side service doors 16 and 17. Each door includes transparent, glass panels X to permit a customer to fully view the floral arrangements prior to purchase.

Figure 2:
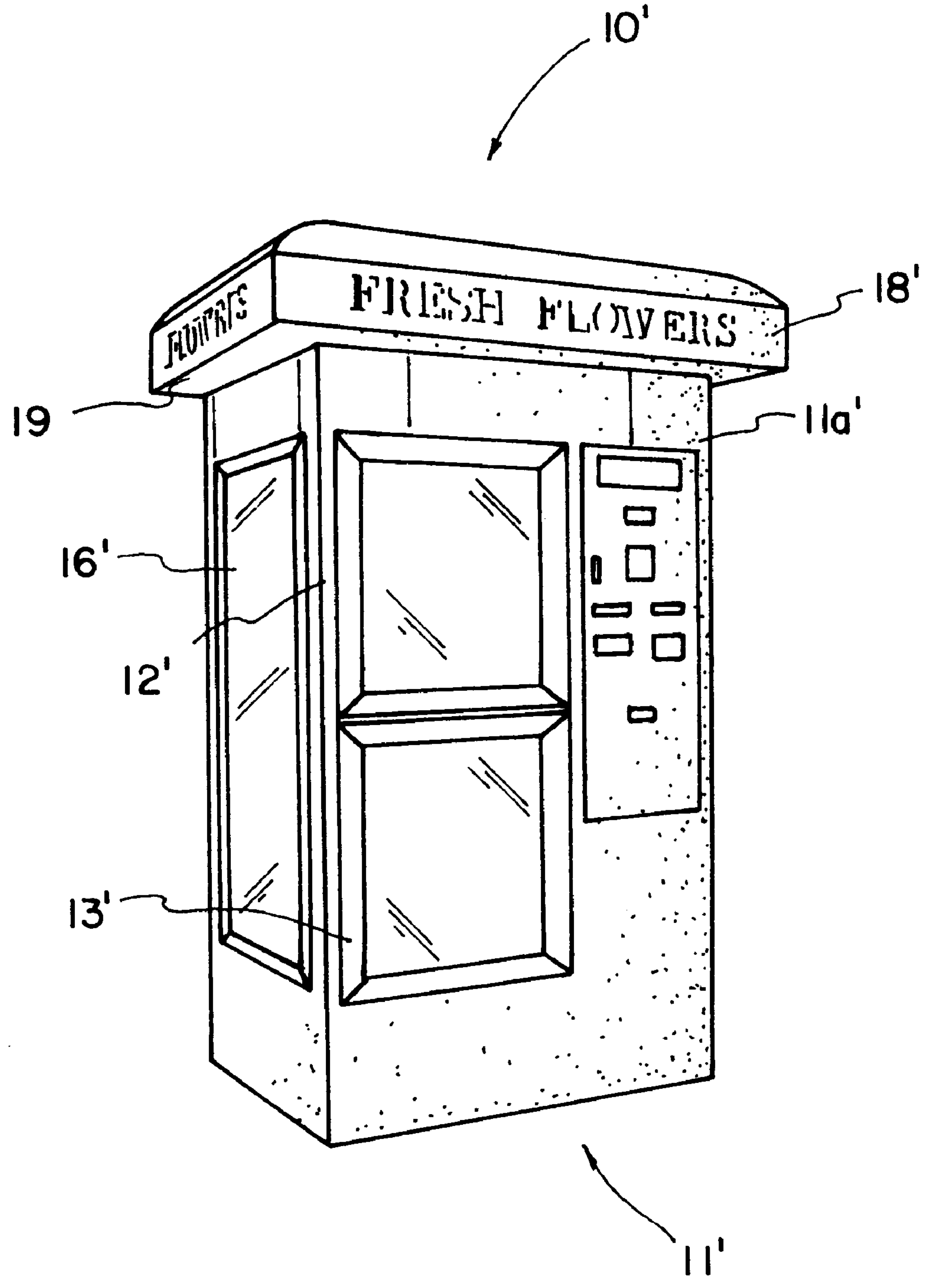
FIG. 2 is a perspective view of an alternative embodiment of the floral vending machine of the present system.

In an alternative embodiment shown in FIG. 2 wherein like components of FIG. 1 are designated by like numerals followed by a prime superscript ('), the vending apparatus 10' includes only two front access doors 12' and 13' and a single side service door 16'.

In the preferred embodiment the housing 11 is a generally box-shaped construction fabricated from a durable grade of sheet metal such as stainless steel which is secured to an underlying support frame (not shown) using suitable attaching hardware.

In the preferred embodiment the housing 11 is provided with an overhanging roof or canopy structure 18 which includes an internally mounted light source (not shown) that provides illumination of the exterior of the housing through lenses 19 to permit customer viewing of the floral arrangements during nighttime hours. The illuminated canopy 18 is fabricated at least in part from a plurality of translucent plastic panels 20 bearing indicia 21 thereon advertising the floral merchandise being vended.

Figure 3:
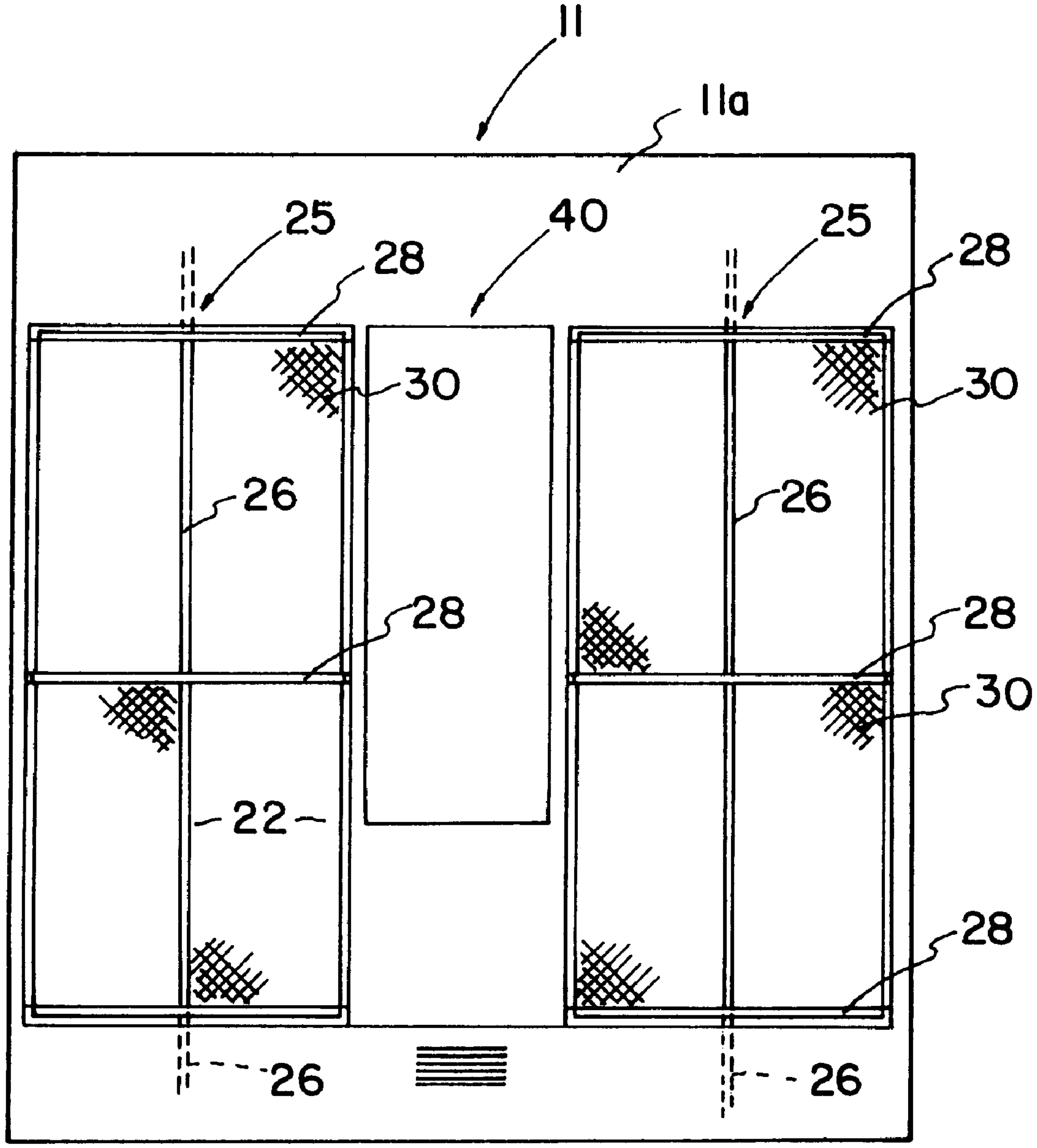
FIG. 3 is a front elevational view of the housing portion of the vending machine shown in FIG. 1 with the vending doors and the control panel removed.

Referring now to FIG. 3 there is shown therein an elevational view of the housing 11 shown in FIG. 1 having the vending doors 12–15 removed for purposes of explanation. The housing 11 includes a pair of rotating carousel display assemblies, indicated generally at 25, each including a vertical drive shaft 26 whereon a plurality of circular shelves 28 are mounted in perpendicular, stacked relation thereto.

Figure 4:
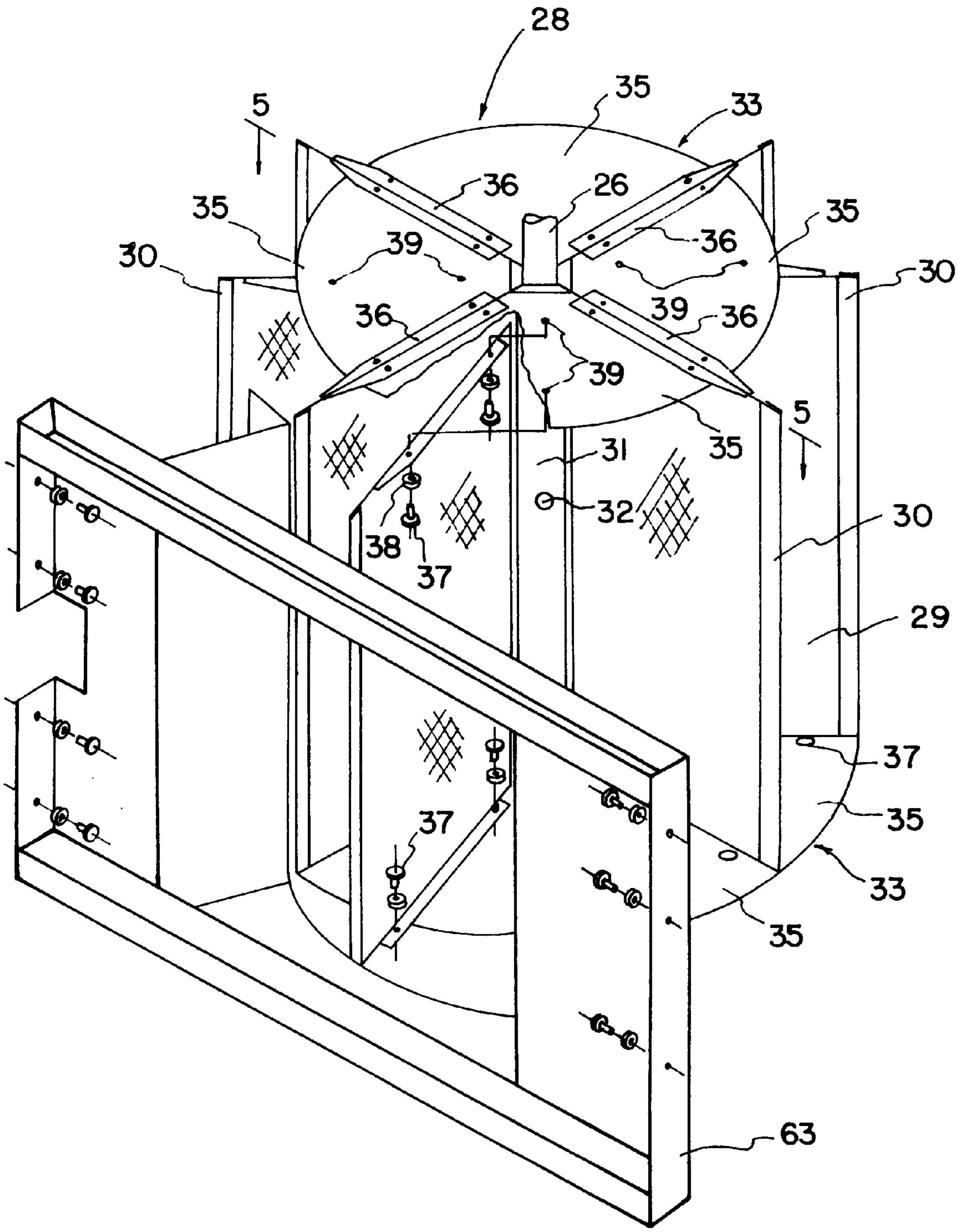
FIG. 4 is a perspective view of a rotating carousel showing the details of the construction thereof.

Each shelf 28 is interconnected by a plurality of radially disposed, mesh dividers 30, so as to define a plurality of generally wedge-shaped compartments 29 between adjoining shelves 28 as more clearly shown in FIG. 4.

In the preferred embodiment each divider 30 is constructed of an expanded metal material such as stainless steel to permit the free flow of refrigerated air between individual compartments 29.

Figure 5:
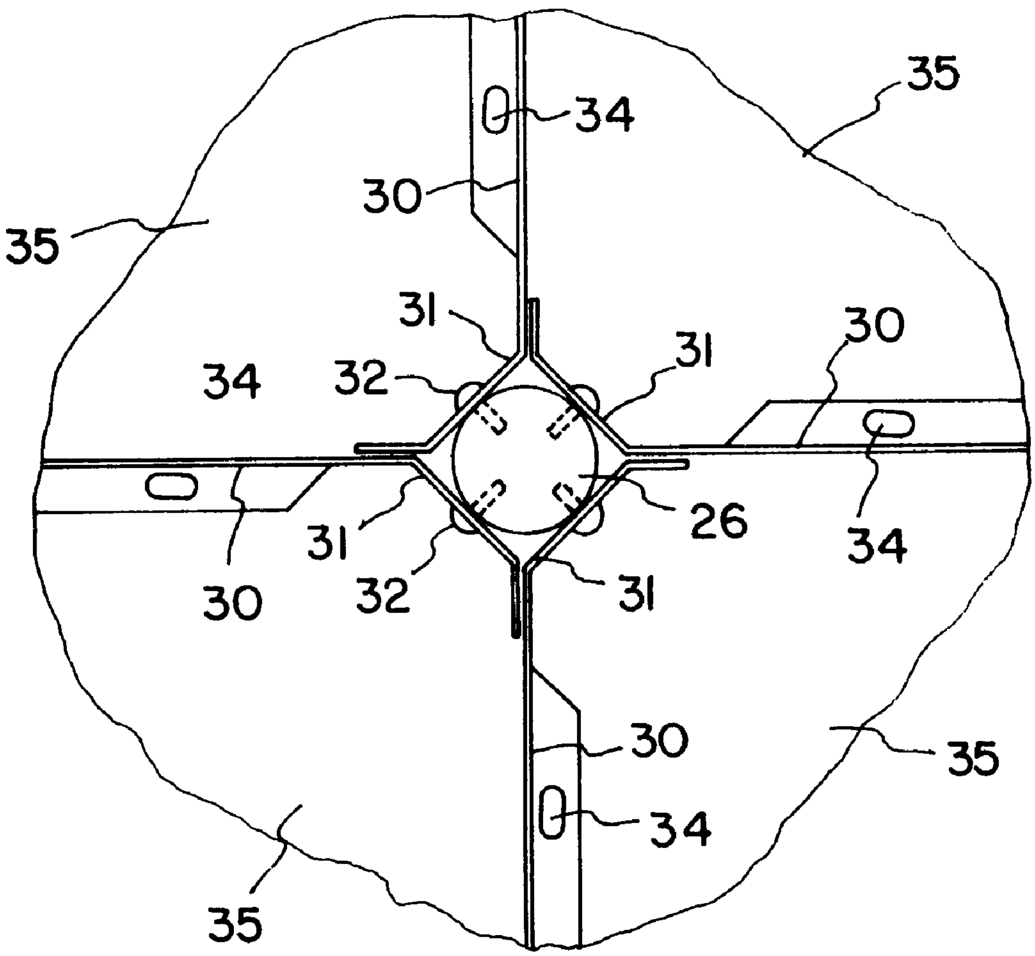
FIG. 5 is a sectional view taken along line 5—5 of FIG. 4 showing the attachment of the dividers to the driveshaft of a carousel.

Referring to FIG. 5 each divider 30 is constructed so as to include an integral mounting flange 31 which extends along the entire inner edge of each divider 30 being bent at approximately 450 thereto to contact the driveshaft 26 at a tangent point for attachment thereto by sheet metal screws 32 or other suitable fasteners.

Each divider 30 also includes upper and lower right-angled shelf flanges 33 having a plurality of slots 34 formed therein for attaching the dividers 30 to the shelves 28 in each carousel assembly.

Each shelf 28 is constructed of a plurality of shelf sectors 35 defined by arc segments of the circular shelf 28 measuring 360°.

The individual shelf sectors 35 are coupled together by the use of a plurality of sector flanges 36 which are designed to secure the adjacent sectors 35 in coplanar relation using suitable fasteners 37 and washers 38.

Referring again to FIG. 4 each sector 35 is provided with an additional pair of mounting holes 39 to accommodate an additional divider 30 to provide as many as eight separate compartments 29 on each carousel shelf. This is advantageous in that the operator may choose to display floral arrangements of various sizes which can be accommodated by dividing each carousel shelf 28 into compartments of an appropriate size. Of course, each carousel shelf 28 within a carousel assembly 25 may be subdivided into a different number of compartments 29 to accommodate a different number of floral arrangements to provide the consumer with a varied selection.

Figure 6:
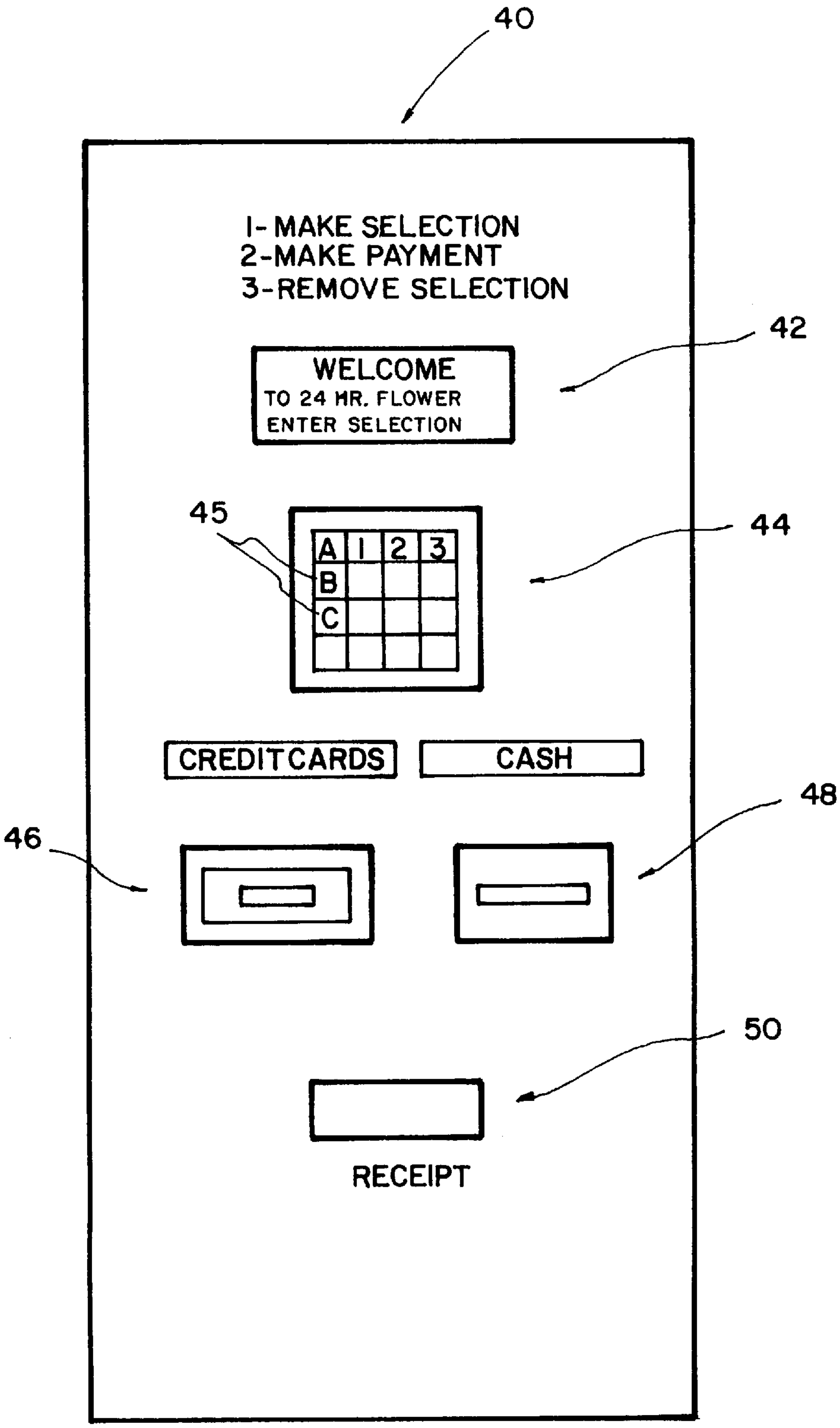
FIG. 6 is a front elevational view of the control panel of the floral vending machine.

The present vending apparatus 10 is provided with a control panel as shown in FIG. 6, indicated generally at 40, which is installed on a front wall 11*a* of the housing. The outer side of the control panel 40 includes an alphanumeric display, indicated generally at 42; an alphanumeric keypad, indicated generally at 44; a credit card strip reader and network terminal, indicated generally at 46; a paper currency validator, indicated generally at 48 and a printer for customer receipts, indicated generally at 50.

The alphanumeric display 42 is used for prompting customer input and showing the status of the purchase process. The display 42 also functions for presentation of messages used during the restocking mode, auditing mode, and during testing and trouble shooting procedures of the present system. In the preferred embodiment the display measures 1" by 3" with four display lines. Line character capacity is 20 characters per line with scrolling capability.

The keypad 44 provides standard alphanumeric selector buttons 45 bearing indicia to identify the individual compartments 29 wherein a floral arrangement resides.

The credit card strip reader includes a magnetic strip reader of the type suitable for commercial transactions. A magnetic strip reader manufactured by American Magnetic Corporation is suitable for this purpose. The credit card is inserted and removed for reading with a green/orange LED reader (not shown) to indicate ready and read status.

The vending apparatus 12 also includes a self-contained credit card terminal 46 which is certified as a terminal for dial-up and access to the credit card processing network through a modem 85 to verify and approve the card for purchase. The assigned merchant account number i.e. (terminal I.D. number) and phone number are entered into the microprocessor or computer 52. Each day's transactions are automatically batched at night and deposited to the checking account designated to the merchant.

The paper currency validator 48 includes a bill acceptor and stacker that will accept $1, $5, $10, and $20 bills. The currency validator 48 is disabled and will not accept cash if the microprocessor 52 detects a machine out-of-order status.

The printer 50 functions to print customer receipts after purchase and is also used for printing sales audit information for the vending machine owner/operator. The printer 50 is a commercial grade, high speed thermal label printer.

Figure 7:
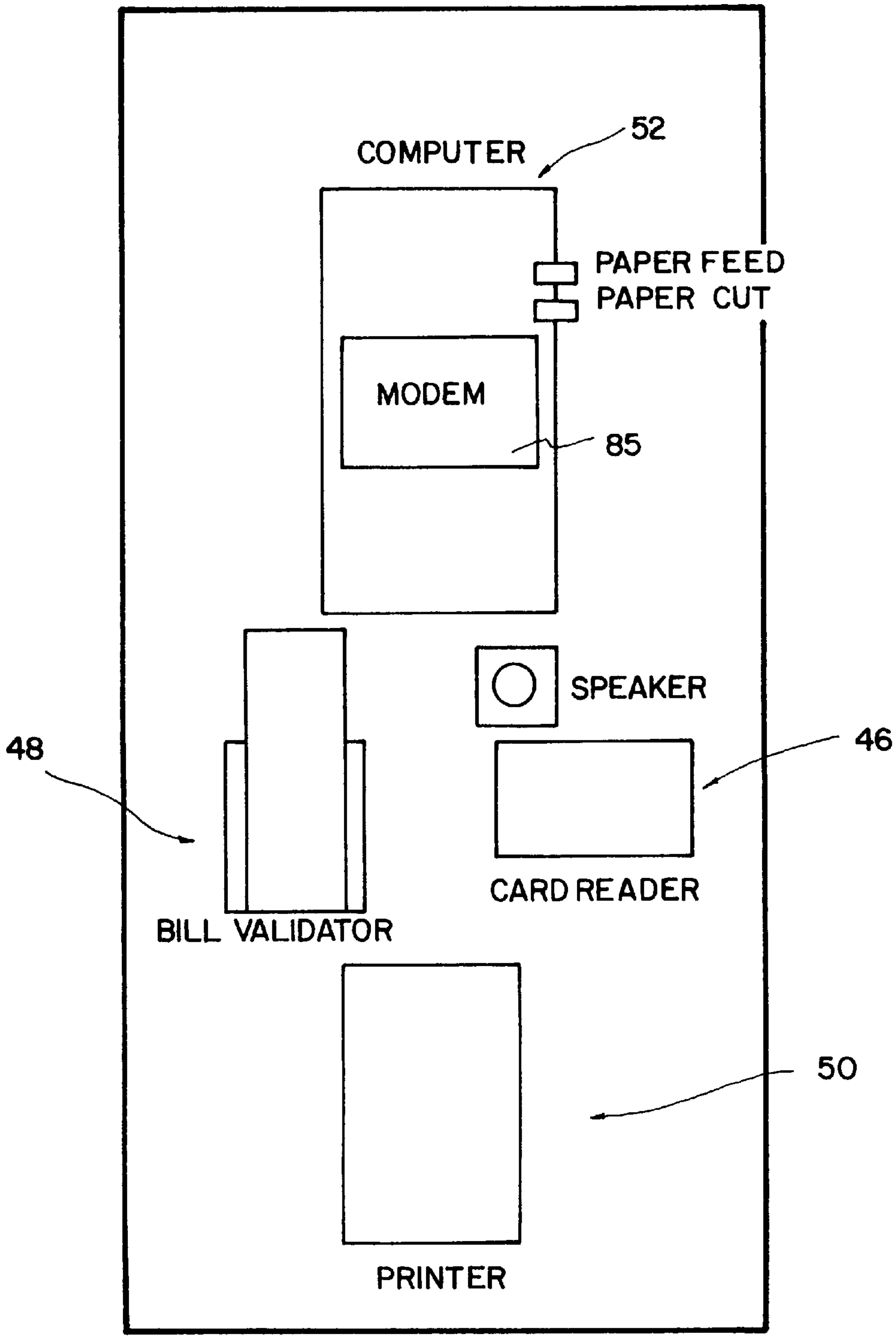
FIG. 7 is a rear elevational view of the control panel of the floral vending machine.

The microprocessor or computer 52 as more clearly shown in FIG. 7 processes and controls all of the input/output from the control panel components described hereinabove and the additional machine components described hereinafter in further detail.

Each of the vending doors 12–15 of the vending apparatus 10 shown in FIG. 1 are controlled by a door latch and lock assembly as shown in FIGS. 6–10.

Figure 8:
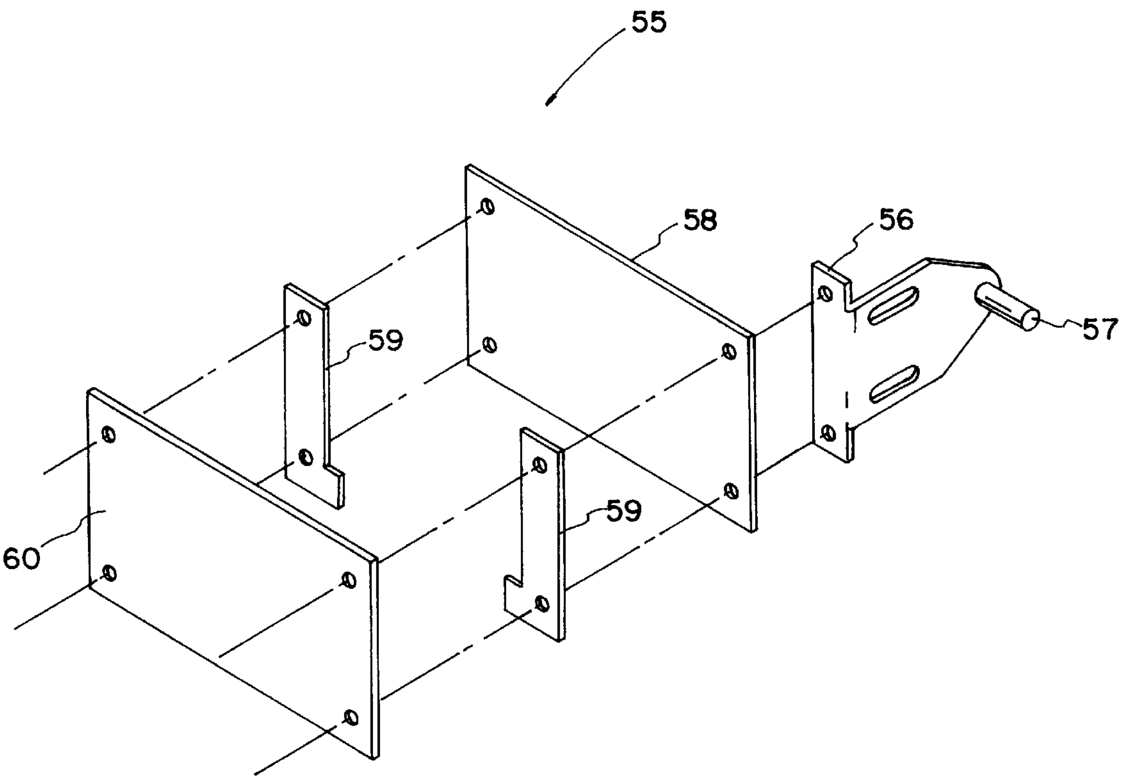
FIG. 8 is a perspective view of the latch pin bracket assembly associated with each vending door of the present vending machine.
Figure 9:
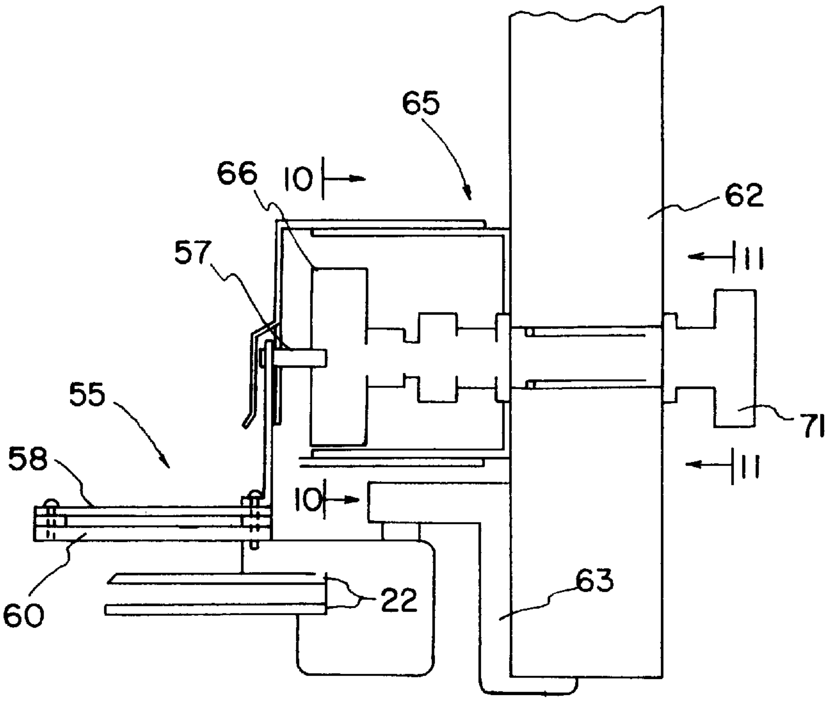
FIG. 9 is a sectional view taken through a door latch assembly of the present vending machine.
Figure 10:
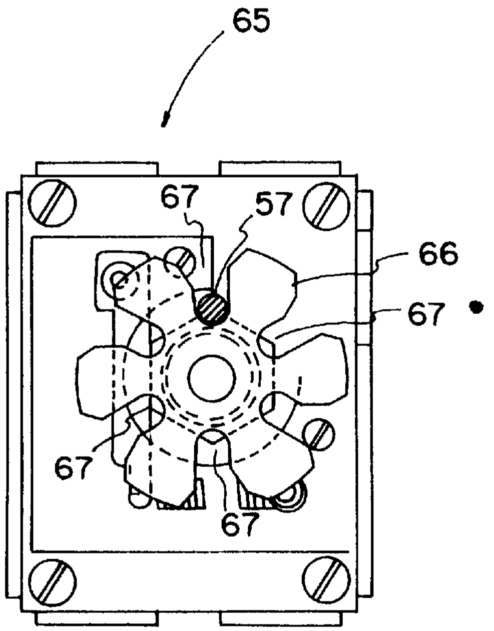
FIG. 10 is a sectional view taken along line 10—10 of FIG. 9.

Referring now to FIG. 8 there is shown therein a latch pin bracket assembly, indicated generally at 55 which is mounted on the interior surface of each vending door 12–15 as more clearly shown in FIG. 9. Each latch pin bracket assembly 55 includes a latch pin bracket 56 whereon a latch pin 57 is fixedly attached. The latch pin bracket assembly 55 also includes a backing plate 58, spacers 59, and a transparent lens 60.

Once assembled and mounted on an interior surface on a door frame 63, the backing plate, spacers, and lens 58, 59, and 60 respectively support a placard (not shown) which bears the purchase price and selection number of the floral arrangement behind that particular vending door.

As shown in FIG. 9, latch pin 57 engages the sprocket 66, that forms a part of the latch assembly, indicated generally at 65 which extends through an interior wall 62 adjacent the door frame 63 mounted in the front wall 11*a* of the housing 11. The sprocket 66 is most clearly shown in FIG. 10.

Figure 11:
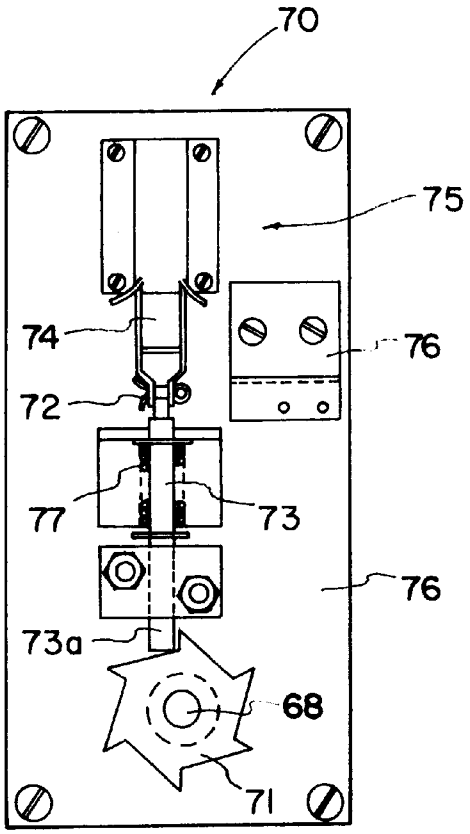
FIG. 11 is a sectional view taken along line 11—11 of FIG. 9 showing the locking mechanism associated with each vending door.
Figure 12:
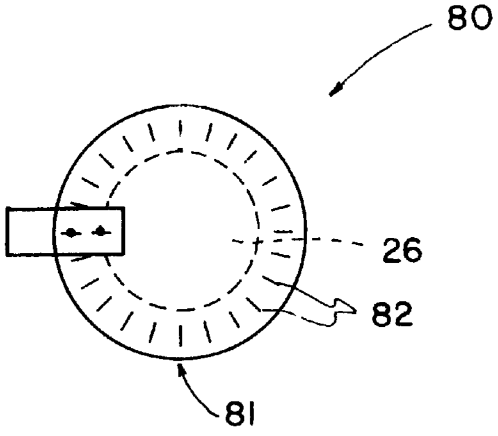
FIG. 12 is a plan view of the encoder disk of the present invention utilized to position the rotating carousels in alignment with the vending doors.

When the left front door 12 or 13 are in the closed position as shown in FIG. 9, the latch pin 57 resides in the uppermost index slot 67 of the sprocket 66 and is secured in this position under normal operating conditions by the locking mechanism, indicated generally at 70, disposed on an opposite surface of interior wall 62 as shown in FIG. 11.

The locking mechanism 70 includes a ratchet member 71 which is mounted in coaxial alignment with sprocket 66 on an opposite end of shaft 68. It will be appreciated by those skilled in the art that both the sprocket 66 and ratchet 71 are fixedly attached on shaft 68 and rotate simultaneously upon rotation of the shaft 68.

The locking mechanism 70 includes a solenoid, indicated generally at 75 including a plunger 74 which is mechanically coupled to an extension pin 73 by use of a cotter key 72 or other suitable attaching hardware.

The solenoid 75 is attached to a base plate 76 in functional relation to the ratchet 71 such that the terminal end 73*a* of the extension pin 73 engages the ratchet 71 in a locked condition preventing rotation of the shaft 68 and, thus, preventing rotation of the sprocket 66 to release the latch pin 57 and to open a vending door.

A door lock switch 76 controls actuation of the solenoid 75 for a predetermined time interval to enable the customer to complete a sales transaction and to remove the floral arrangement from the selected vending door.

After the predetermined time interval has elapsed, the solenoid 75 and extension pin 73 return to the locked condition by the pressure of a compression spring 77 that is radially disposed about the extension pin 73 as shown in FIG. 11.

It will be appreciated by those skilled in the art that each vending door 12 through 15 is provided with a latch assembly 65 and locking mechanism 70 in a configuration to accommodate the right or left orientation of the vending doors in the housing. The solenoids 75 for each vending door are controlled by the microprocessor 52 upon the required input and payment by a customer.

The mechanical motion and position of the carousel assemblies 25 is controlled by the microprocessor 52 in conjunction with an optical encoder, indicated generally at 80 which is mounted at a top end of drive shaft 26. An encoder 80 of the type manufactured by the Hewlett-Packard Corporation is suitable for this purpose.

The number of encoders 80 on a vending machine 10 is controlled by the number of motors (not shown) used to drive the two carousel assemblies 25. Thus, the possible configurations on the vending machine shown in FIG. 1 are one encoder/motor combination or two encoder/motor combinations. The software program for the microprocessor 52 will read the number of motors connected and offer the two encoder option when two motors are utilized.

Figure 13:
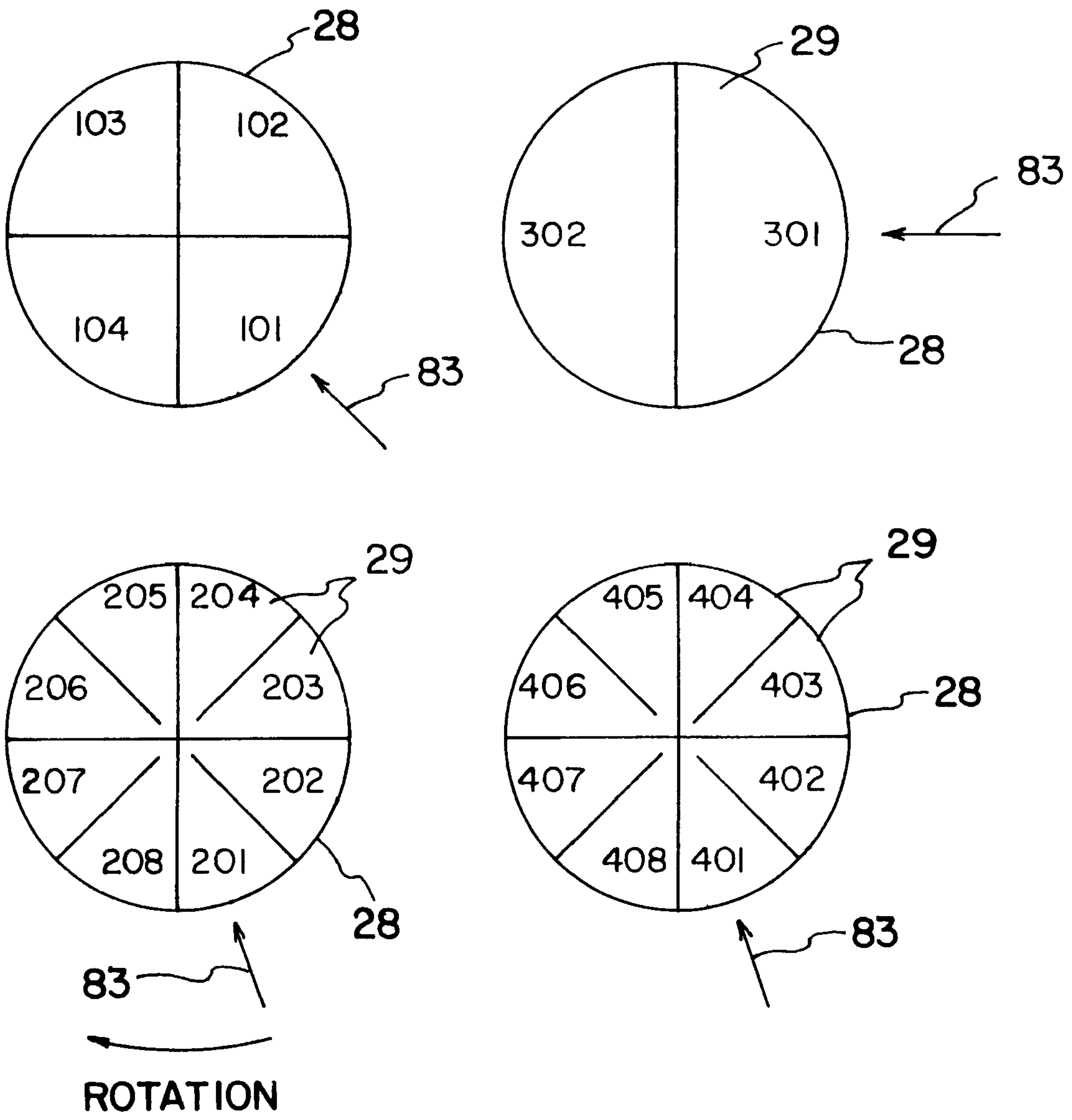
FIG. 13 is a composite plan view of each of the carousel shelves of the vending machine shown in FIG. 1 including the numbered positions of each of the compartments thereon corresponding to a distinct position on the encoder disk shown in FIG. 12.

The encoder 80 includes an encoder disk 81 containing a plurality of indicia thereon corresponding to each compartment 29 defined on the carousel shelves 28 as shown in FIG. 13. In the preferred embodiment the encoder disk 81 includes indicia corresponding to 1,024 distinct positions corresponding to points on the circumference of each carousel shelf 28 which are assigned a unique number as indicated by arrows 83 in FIG. 13.

Since such encoder devices are in a practical state of development, further detailed discussion of the same is not deemed necessary.

Thus, when a customer selects a number corresponding to a floral arrangement within a compartment 29 and inputs this selection on the keyboard, the microprocessor 52 actuates an electric motor (not shown) coupled to a driveshaft 26 which rotates that particular carousel compartment 29 to a position in alignment with the designated vending door 12–15.

Of course, the encoder disk 81 is aligned to a preset position relative to the driveshaft(s) 26 and the carousel compartment(s) 29 in accordance with the manufacturer's instructions at the time the vending machine is set up for operation.

The vending machine 10 also includes a thermostatically controlled refrigeration unit (not shown) in the lower portion of the housing 11. The thermostat control (not shown) for maintaining the housing 11 at a desired temperature is located within the housing 11 in the top of the unit. The recommended setting for the air temperature within the housing 11 should average 40° F. for fresh flowers. The thermostatic control is set up in accordance with the manufacturer's instructions.

Since such thermostatically controlled refrigeration units are well known to those skilled in the art, further detailed discussion of the same is not deemed necessary.

In practical use, the operation of the vending machine 10 is very simple. As the customer approaches the machine 10 the carousel assemblies 25 are in a continually rotating mode for the optimal display of floral arrangements. The LCD display 42 requests that the customer ENTER SELECTION. At this point, the customer can either enter the door letter and number of the selection they wish to purchase or make payment. While it is typical that they will make their selection first, it is not necessary that the selection be made prior to payment.

When the customer enters the letter and number of their selection, the carousel assemblies 25 will continue to rotate until that compartment or bin 29 is positioned in front of the appropriate vending door. Rotation will then stop as the customer is prompted to enter payment in either cash or credit card. The customer may press CANCEL and the carousel will continue to rotate.

Cash payment is made into the bill validator 48 on the control panel. The display 42 will provide a running total of the amount the customer has put into the validator 48.

Credit card payment is made by swiping the credit card in the card reader of the credit card terminal 46. The LED light on the card reader will turn green to show that the card was successfully read. When operating the machine 10 with Credit Card Processing set for Off Line mode, there is no credit card approval prior to purchase. The display 42 will ask the customer to PLEASE WAIT while the card is being checked against the bad card file. When a card is declined due to closed or invalid account, that single credit card number is entered into the machine's BAD CARD FILE preventing future purchases with that particular card.

If the machine 10 is operating in the On Line mode, the machine will call the credit card carrier and get approval. If a card is unapproved, the message CARD REJECTED will appear on the display 42 and the machine 10 will return to normal operation.

Once payment is made, the customer is prompted to REMOVE SELECTION. Once the product is removed, a receipt is printed showing the amount of purchase, time and date. This information is also retained in the machine for later printing on the audit report.

Thereafter, the display 42 returns to the ENTER SELECTION mode and awaits the next sale. The microprocessor 52 will not permit the selection of a compartment or bin 29 from which a product has been sold until that compartment has been restocked by the operator of the system.

The machine controls provide a MANAGEMENT mode to perform machine management functions. Entry to the MANAGEMENT mode is obtained upon entry of a password into the keypad 44 which causes a menu to appear on the display 42. The operator may select SETUP which allows configuration of the machine functions or TEST which allows testing of the control panel functions to verify normal operation.

The SETUP function stores the dial-out phone number dialed by the flower center to access the Global Payment Systems Network for credit card approval; the terminal ID or Merchant Account Number that identifies the unit when it dials out for credit card approvals; the On-line or Off-line mode of operation; the type of card accepted i.e., Visa, Mastercard, etc.; the number of times a particular card can be used within a twenty-four hour period; time and date functions; bin configuration i.e., the number of bins behind each door; the number of vending doors; and password/pin number changes.

The TEST mode functions to operate all components to verify that they are fully functional. The TEST mode verifies the Cabinet Status showing the status of the door locks, encoder, motor, printer, card reader, bill validator, the credit card reader, the display, the keypad, and the modem. All such test functions are carried out in accordance with the Operation Manual provided by the manufacturer.

The machine controls also provide a SERVICE mode which is used to restock, empty bins, clean the machine, change door prices, print audit reports, clear the audit file, feed paper into the printer after changing the roll, and entering bad credit card numbers.

The SERVICE mode also enables the operator to print an audit tape of all transactions conducted by the vending machine over a given time period. This tape will show cash sales, credit card sales with the card number, and any sales which were not vended. Non-vended sales reporting helps to resolve issues with customers who claim they put money into the machine and didn't get a flower. If the door was not opened to remove the product, then the audit report will show a CASH OVERAGE with the date and time.

A significant advantage of the present vending machine is the capability to perform an off-site audit of the machine. This is accomplished by using the Modem Emulation software of the operator's remote computer to dial into the vending machine for inventory status. To perform an off-site audit of the vending machine 10, the operator's Modem Emulation Program calls the phone number of the line connected to the vending machine 10 using predetermined settings. Once a connection has been made with the fully integrated modem 85 in the 24-Hour Flower machine 10, the operator presses RETURN on the computer keyboard. The microprocessor 52 will then transmit a greeting, the bin status, printer status, bill validator status, and card reader status.

This information is advantageous to the operator in that maintenance and restocking can be carried out on-line in an efficient manner to maximize the opportunity for customer sales.

From the above it can be seen that the present invention provides a state-of-the-art vending machine for floral and plant arrangements which can be accessed by customers 24 hours per day.

The present invention is capable of transacting both cash and credit purchases being a certified credit card terminal connected to the credit card processing network.

The terms "right", "left", "side" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A vending system for the display and sale of floral arrangements, comprising:

a housing having a transparent vending door for providing access into an interior portion thereof;

a rotatable carousel positioned in said interior portion of said housing in alignment with said door;

a plurality of compartments on said carousel for holding the floral arrangements, each compartment having a registered position with said door;

indicia means associated with each of said compartment means;

means for normally rotating said carousel whereby said compartments and floral arrangements associated therewith are continuously viewable by a prospective purchaser;

means for locking said door means;

selector means operable by said purchaser for selecting one of said compartments as referenced by said indicia means;

control means responsive to operation of said selector means for continuing rotation of said carousel until said one of said compartments is registered with said one of said doors at said registered position and for discontinuing said rotation at said registered position, said control means disabling said means for locking said door means thereby permitting the purchaser to open said door and remove the floral arrangement carried in said one of said compartments; and means responsive to the closure of said door for resuming rotation of said carousel and thereafter preventing positioning of said one of said compartments at said registered position until a new floral arrangement has been located therein.

2. In an automated vending system for the sale of floral arrangements, an improved display and vending enclosure, comprising: a generally box-like housing having an interior storage space, said housing having a front wall including a plurality of vertically aligned transparent vending doors for providing access into said interior storage space; cooling means associated with said interior storage space for circulating cooled air therewithin; a carousel positioned in said interior storage space and rotatable about a vertical axis in alignment with said doors; a plurality of vertical rows of compartments carried by said carousel for holding the floral arrangements, each row being vertically aligned with one of said doors, and each compartment associated with said row having a vending position in registry with an opposed door; first indicia means associated with each of said doors and second indicia means associated with each of said compartments; a motor operatively associated with said carousel; control means for operating said motor whereby said compartments and floral arrangements are continuously viewable by a prospective purchaser; through said doors; lock means for normally locking said doors; selector means operable by said purchaser for selecting one of said doors referenced by said first indicia means and one of said compartments referenced by said second indicia means, said control means being responsive to purchaser operation of said selector means for continuing rotation of said carousel until said one of said compartments is registered with said one of said doors at said vending position and for thereafter disabling said motor to discontinue said rotation of said carousel at said vending position, said control means disabling said locking means thereby permitting the purchaser to open said one of said doors and remove the floral arrangement carried in said one of said compartments; and means responsive to the closure of said one of said doors for enabling said motor for resuming rotation of said carousel and preventing positioning of said one of said compartments thereat until a new floral arrangement has been located therein.

3. The display system as recited in claim 2 wherein a side wall of said housing includes a service door accessible for transferring floral arrangements onto said compartments.

4. The display system as recited in claim 2 wherein said compartments in said rows include circular shelves and radially extending perforated partitions including opening for permitted the circulation of cooled air therepast.

5. The display system as recited in claim 4 wherein said compartments includes means for variably circumferentially disposing said partitions for accepting floral arrangements of differing sizes.

6. The display system as recited as recited in claim 5 wherein said perforated partitions are formed of expanded sheet metal.

7. The display system as recited in claim 2 wherein payment validating means for accepting payment from said purchaser are operatively associated with said locking means and said selector means for preventing opening of said doors prior to accepting and validating said payment.

8. The display system as recited in claim 7 wherein said lock means includes an electromechanical latch assembly operatively associated with each of said doors.

9. The display system as recited in claim 7 wherein said validating means includes a certified credit card terminal and a telephone modem for connection with a credit card processing network.

10. The display system as recited in claim 9 wherein said validating means includes a paper currency validator capable of receiving and accumulating paper money for purchase of a floral arrangement.

11. The display system as recited in claim 10 wherein said selecting means includes an alphanumeric keypad operatively connected with said latch assembly, said validating means and said selector means for unlocking said door when said compartment bearing the selected second indicia means is at said vending position.

12. The display system as recited in claim 11 wherein said control means includes a microprocessor operatively connected with said carousel, said motor, said latch assembly, said validating means and said selecting means.

13. The display system as recited in claim 12 wherein said microprocessor includes an integrated modem for connection by said telephone line to a remote computer to permit auditing of purchase of floral arrangements.

14. The display system as recited in claim 13 including a printer operatively connected with said microprocessor for printing a transaction receipt for a purchaser.

15. The display system as recited in claim 14 including an encoder operatively connected with said microprocessor for positioning said compartment at said registered position.

* * * * *